Figure 1:
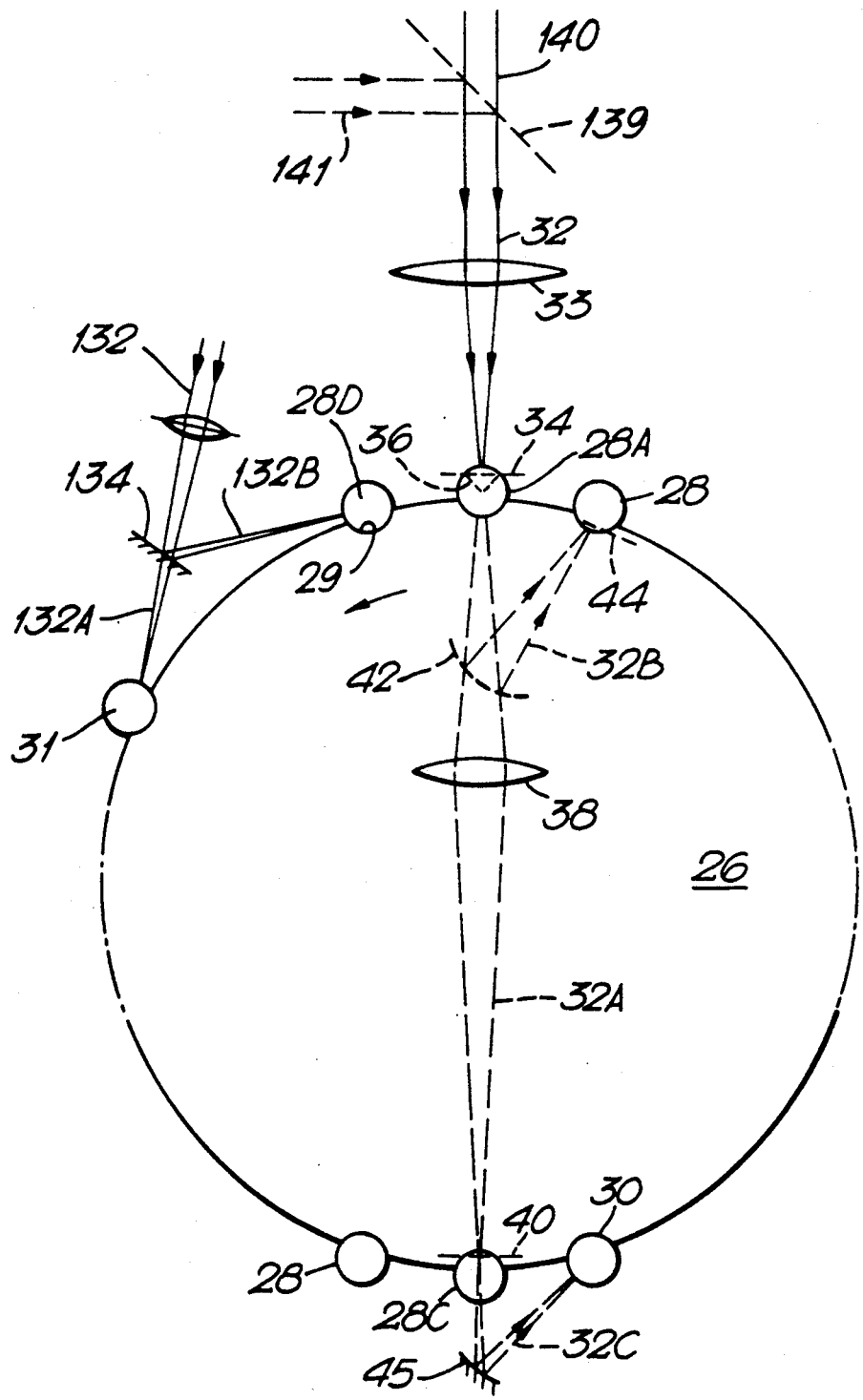

United States Patent [19]
Aindow et al.

[11] Patent Number: 5,186,184
[45] Date of Patent: Feb. 16, 1993

[54] CIGARETTE MANUFACTURE

[75] Inventors: Alan M. Aindow; Michael J. Cahill; John Dawson, all of Coventry, England

[73] Assignee: Molins PLC, London, England

[21] Appl. No.: 619,967

[22] Filed: Nov. 30, 1990

[30] Foreign Application Priority Data

Dec. 6, 1989 [GB] United Kingdom ............... 8927534

[51] Int. Cl.$^5$ .......................... B23K 26/00; A24C 1/38
[52] U.S. Cl. .................................. 131/281; 219/121.7; 219/121.71
[58] Field of Search ...................... 131/281; 219/121.7, 219/121.71, 121.6, 121.77; 350/6.1, 6.2, 6.5, 6.7

[56] References Cited

U.S. PATENT DOCUMENTS

| | | | |
|---|---|---|---|
| Re. 31,478 | 12/1983 | McArthur et al. | 219/121.77 X |
| 4,519,680 | 5/1985 | Grollimund | 350/6.5 X |
| 4,585,919 | 4/1986 | Mattei et al. | 219/121.7 |
| 4,701,591 | 10/1987 | Masaki et al. | 219/121.77 |
| 4,720,619 | 1/1988 | Mattei et al. | 2129/121.77 X |
| 4,767,909 | 8/1988 | Okumoto | 131/281 X |
| 4,827,947 | 5/1989 | Hinz | 131/281 |
| 4,860,773 | 8/1989 | Okumoto et al. | 131/281 |
| 4,916,272 | 4/1990 | Okumoto et al. | 131/281 X |
| 4,961,080 | 10/1990 | Henderson et al. | 350/6.5 X |

FOREIGN PATENT DOCUMENTS

| | | | |
|---|---|---|---|
| 0021165 | 1/1981 | European Pat. Off. | 131/281 |
| 2032323A | 9/1979 | United Kingdom . | |
| 2157540A | 4/1985 | United Kingdom . | |
| 2230688A | 4/1990 | United Kingdom . | |

Primary Examiner—Theatrice Brown
Assistant Examiner—J. Doyle
Attorney, Agent, or Firm—Antonelli, Terry, Stout & Kraus

[57] ABSTRACT

Cigarette perforating apparatus comprises a rotary stepped reflector (5) for directing an incident laser beam (2) along a reflected path (2R) to produce axially spaced perforations on a cigarette. The size of the perforations is controlled by varying the duration of the reflected beam by means of a mask (8) which is rotatable with the reflector and effective to intercept the beam for varying periods dependent on the radial distance at which the beam is incident on the reflector. The reflected beam (2R) may be further divided to provide separate beam paths (e.g. leading to the separate cigarette tracks in a filter attachment machine) by means of a further reflective disk (12) synchronized with the stepped reflector.

20 Claims, 7 Drawing Sheets

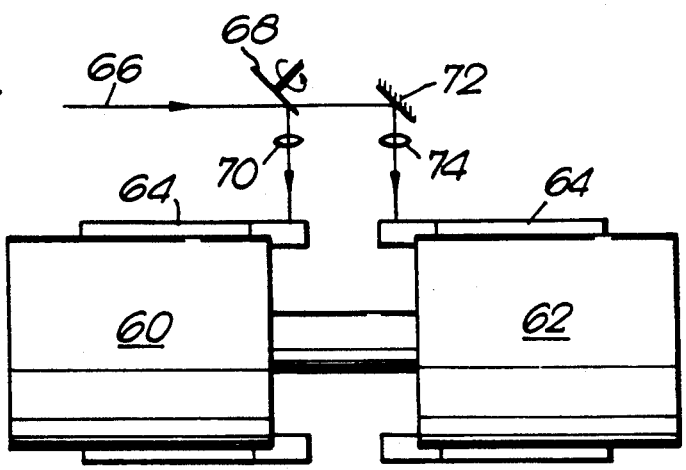
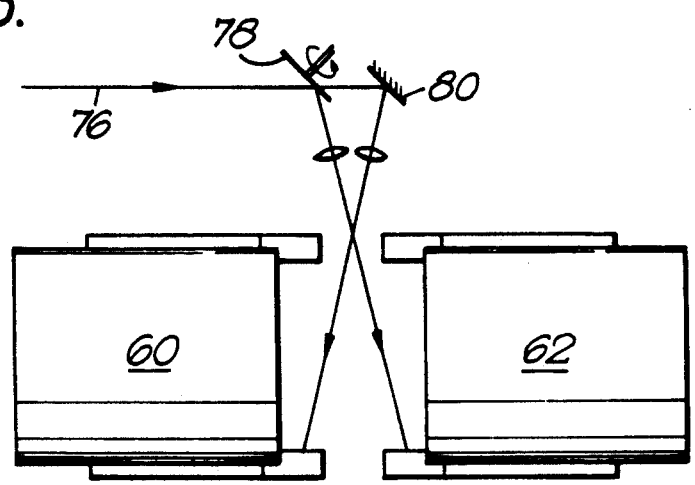
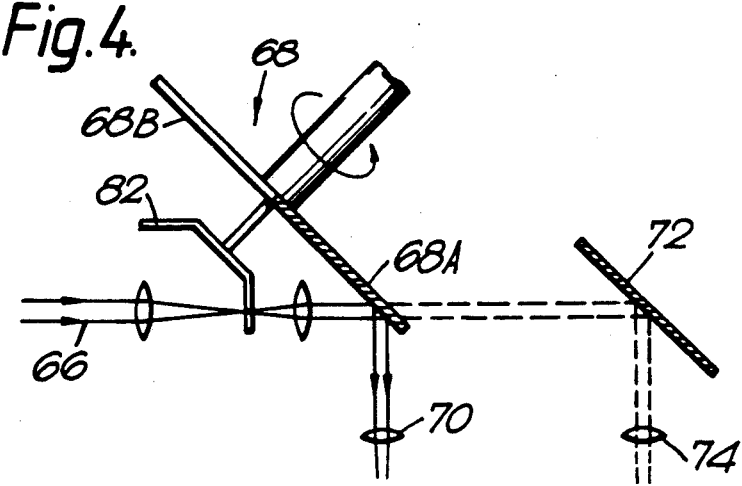

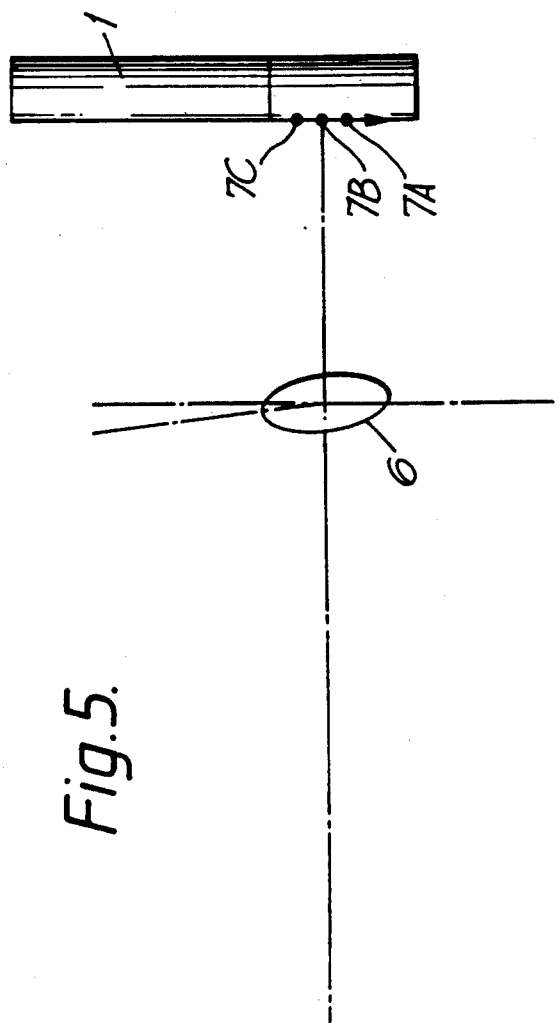
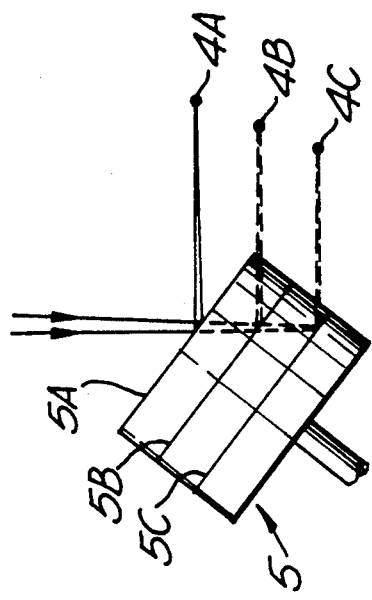
Fig.6.
Fig.5.

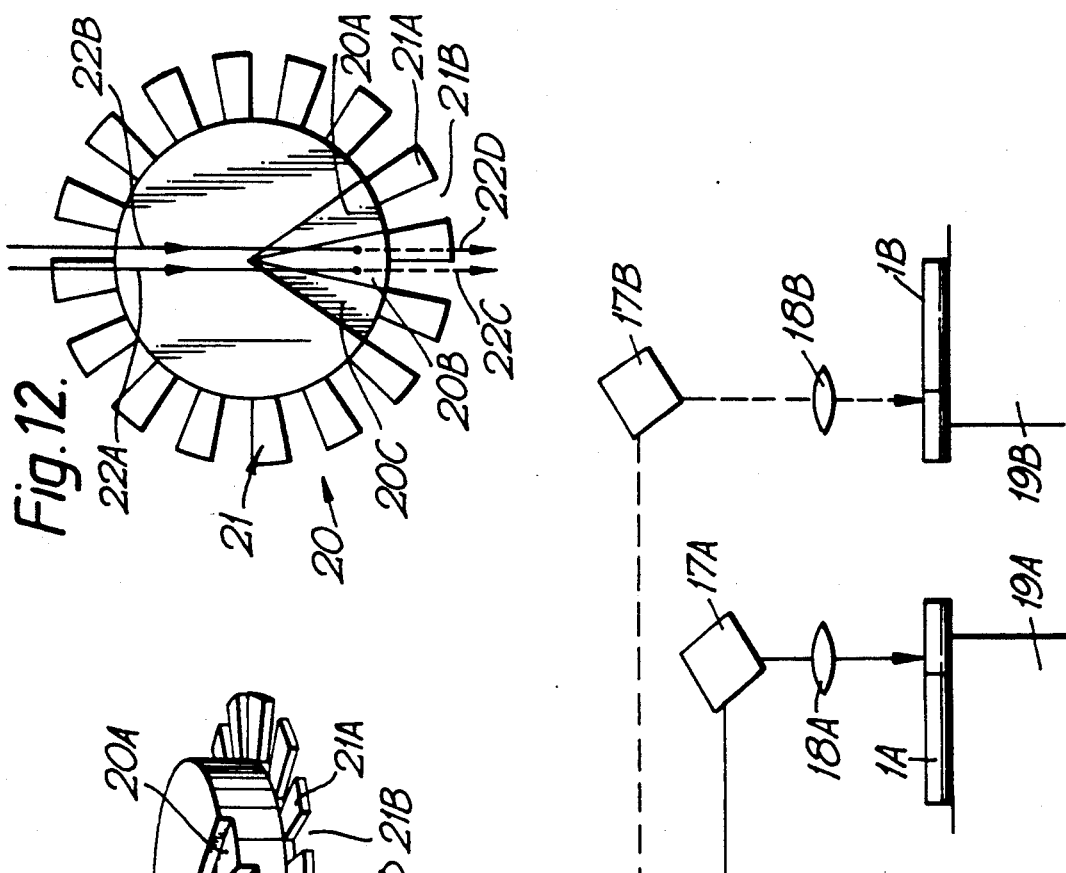
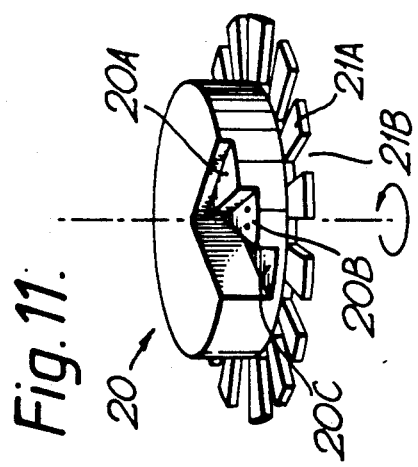
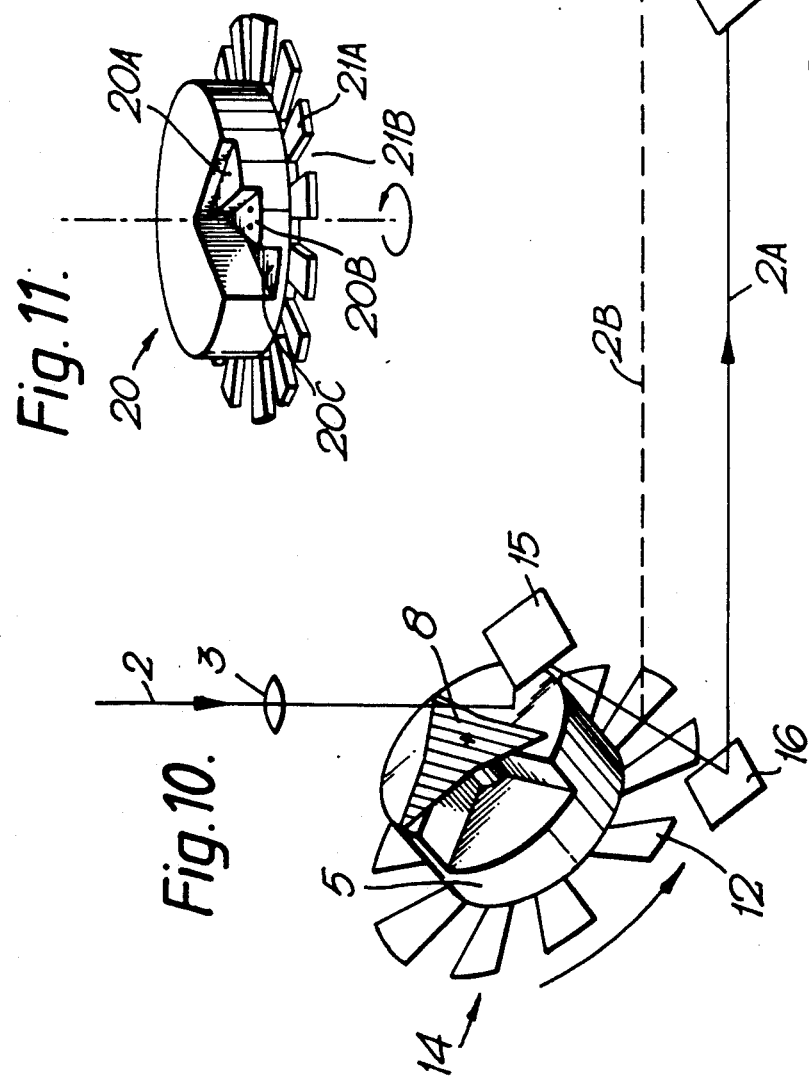

CIGARETTE MANUFACTURE

This invention relates to cigarette manufacture, particularly the manufacture of ventilated cigarettes which have perforations generally in the region of the filter or mouth end of the cigarette.

It is known to produce perforations in the wrappers of complete or nearly complete cigarettes by means of a focused laser beam. Known systems for achieving this typically involve rotating the cigarette about its own axis, which can be damaging to the cigarette, or are mechanically or optically complicated, or require excessively high levels of laser power. An object of the present invention is to produce a system which lacks at least some of these potential problems.

In UK patent specification No. 2230688A there is disclosed a method of perforating cigarettes by means of a laser beam, which comprises conveying cigarettes in sequence in a direction transverse to their lengths, causing a laser beam to be directed along a plurality of different paths by means of a rotary member whose movement is preferably synchronised with that of the cigarettes, and focusing the beam on said different paths so that each cigarette receives a series of circumferentially-spaced and/or longitudinally-spaced perforations. The rotary member may comprise stepped reflecting surfaces which produce substantially parallel beams which are subsequently reflected and focused on different cigarettes and/or on different longitudinal positions of each cigarette. The present invention is applicable particularly, but not exclusively, to apparatus for performing a similar method. The disclosure of said specification is hereby incorporated herein in its entirety.

According to one aspect of the present invention apparatus for perforating cigarettes by means of a laser beam comprises a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means synchronised with the rotary member for controlling the quantity of energy directed along a path. By way of explanation, the quantity of energy is generally related to the size of perforation, which in turn relates to the final cigarette dilution level. If, as is usually the case the laser power is not varying, i.e. the laser beam is continuous at the same power or, if the laser is pulsed the source (or otherwise). the quantity of energy in each pulse is constant, the quantity of energy may be controlled by controlling the time during which a reflective surface is directing radiation along a particular path. The controlling means could therefore include means for varying the speed of rotation of the rotary member relative to that of the cigarette (which would normally be conveyed in a direction transverse to its axis, e.g. on a conveyor drum). It is generally preferred, however, to synchronise the speed of the rotary member and of the cigarettes, so that perforation levels can remain constant at varying speeds of production of cigarettes, so that varying the speed of the rotary member relative to that of the cigarettes may introduce an unwelcome complication. A preferred arrangement for controlling the quantity of energy directed along a path is to provide means for varying the angle of rotation of the member during which a surface is effective to direct the beam along its associated path. Thus, for example, if the rotary member is generally circular about its axis of rotation and if a reflective surface occupies a sector of that circular shape, it will be appreciated that if the periphery of the reflective surface is modified slightly so that it has non-radial edges then the angular extent of the surface can vary according to radial distance from the axis of the member. Hence, if the laser beam is incident at a first radius then the proportion of each revolution of the member during which the surface reflects the beam along its associated path will differ from that when the beam is incident at a second radius. The means for varying the angle of rotation during which a surface is effective may, therefore, comprise means for causing relative movement of the rotary member and the incident laser beam so as to vary the radial position at which the laser beam impinges on the surface. Where the axis of the rotary member is inclined to the incident beam this may be achieved by moving the rotary member relative to the beam, either in an axial direction or in a direction transverse to its axis.

In a preferred arrangement the rotary member has a series of reflective and transmissive portions (e.g. reflective surfaces and gaps or stepped reflecting surfaces) which extend around the member and, where the member has a generally circular periphery, each of these portions may occupy a sector with radial transitions between the portions. It should be noted that a rotary member with stepped reflecting surfaces comprises reflective surfaces and gaps in at least one operative plane, and is hence regarded as having a series of reflective and transmissive portions. In this arrangement an absorbent (or possibly reflective) mask having non-radial edges is located on the member for rotation therewith and provides the means whereby the effective angular extent of each portion, e.g. a reflective surface, may be varied. In such an arrangement the rotary member and incident beam may still be relatively movable to provide variation in the operative period for each portion. Alternatively, it may be acceptable to have replaceable masks which are provided for different required dilution levels, in which case the masks need not have non-radial transitions and no relative movement of the rotary member and the beam would be necessary. A further possibility is to provide a mask having a complex structure comprising relatively movable elements which could be adjusted to provide the required obscuring of each portion, again without the need for any relative movement of the rotary member and the incident beam. Such complex masks could be controlled so as to vary their effective shape during rotation of the rotary member.

A further reflective rotatable element, which may be synchronised with the rotary member, may be arranged to further divert a beam reflected from the surface of the rotary member. Such a rotatable element may comprise alternate reflective and transmissive sections (preferably of equal angular width) arranged so as to direct the reflected beam alternately along generally parallel paths which respectively lead to cigarettes in one or other of two streams moving transverse to their lengths. The transmissive sections preferably simply constitute gaps between the reflective sections but they could comprise transparent elements, e.g. lenses. Such a rotatable element is therefore usefully combined with said rotary member in a conventional filter attachment machine which provides two parallel transversely-moving streams of filter cigarettes.

The rotatable element and rotary member are preferably synchronised and arranged with at least one reflective and one transparent section of the rotatable element associated with each reflective surface of the rotary member, so that the beam reflected from each of said surfaces may be time-shared between the two streams of cigarettes. The rotatable element and rotary member may be rotatable about a common axis.

According to a further aspect of the invention apparatus for perforating cigarettes by means of a laser beam comprises a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means arranged to allow partial interception of a beam incident on or reflected from said surface so as to reduce the proportion of radiation being directed along the path associated with said surface. Preferably said apparatus further includes a series of spaced reflective elements synchronised for rotation with said rotary member and arranged so as to cause a beam reflected from a surface of said rotary member to be directed along first and second paths according to whether the beam is intercepted by a reflective element or not.

For avoidance of doubt although the term "laser" is used throughout, the invention is applicable to any suitable coherent radiation capable of burning or otherwise forming perforations in the wrappers of cigarettes. Additionally, reference herein to "cigarettes" is not intended to exclude similar smokable articles or to exclude incomplete or unfinished cigarettes or assemblies from which cigarettes are produced. For example, a filter attachment machine generally produces double length assemblies which are subsequently divided at their mid-points to produce filter cigarettes: the invention is applicable to perforation of such assemblies.

It should also be understood that reference herein to use of reflectors for focusing a laser beam is intended to include a combination of reflectors and separate focusing elements, e.g. lenses.

Since the beam is switched automatically between various parts of cigarettes by passage of reflectors (and-/or gaps) through the beam path it is possible to use a continuous laser beam instead of a pulsed beam commonly used hitherto (although use of a beam pulsed at source or otherwise is not excluded). This can allow more efficient use of a laser and hence use of the laser of lower power. In particular a wave guide laser can be used instead of the higher power low pressure gas lasers previously necessary (although use of such gas lasers is not excluded).

It should be noted that the various aspects of the invention may be used in combination or in the same apparatus.

Figure 7A:
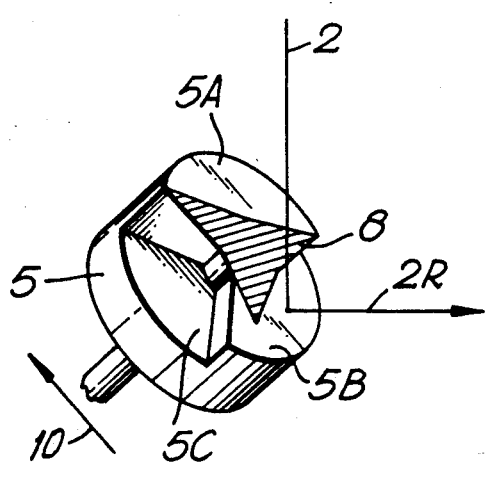
Figure 7B:
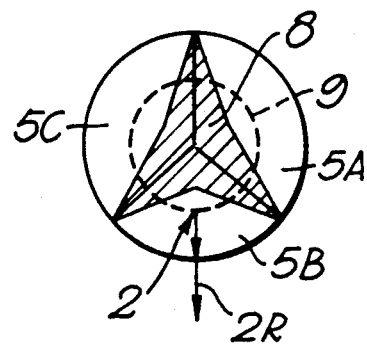
Figure 7C:
Figure 9:
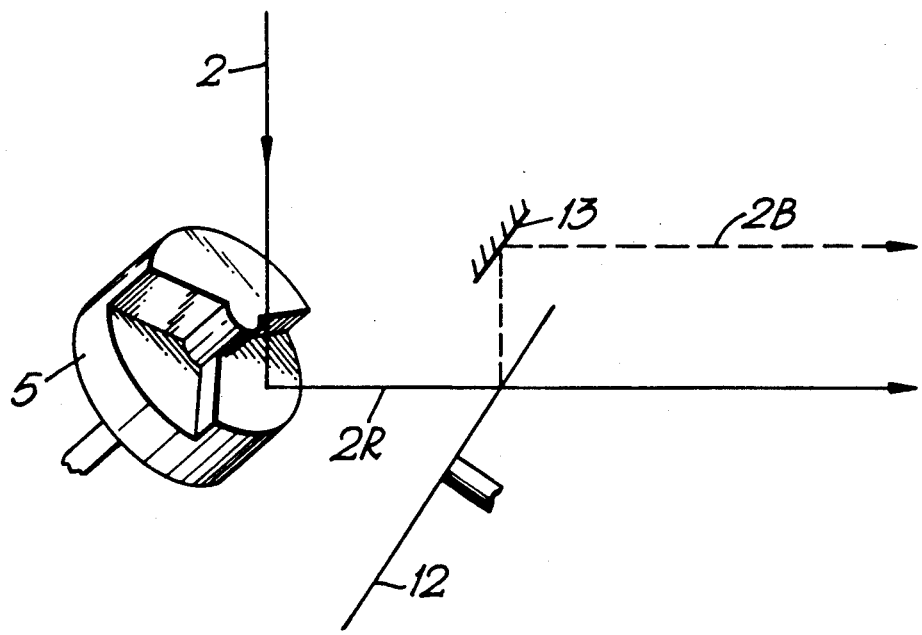
Figure 8:
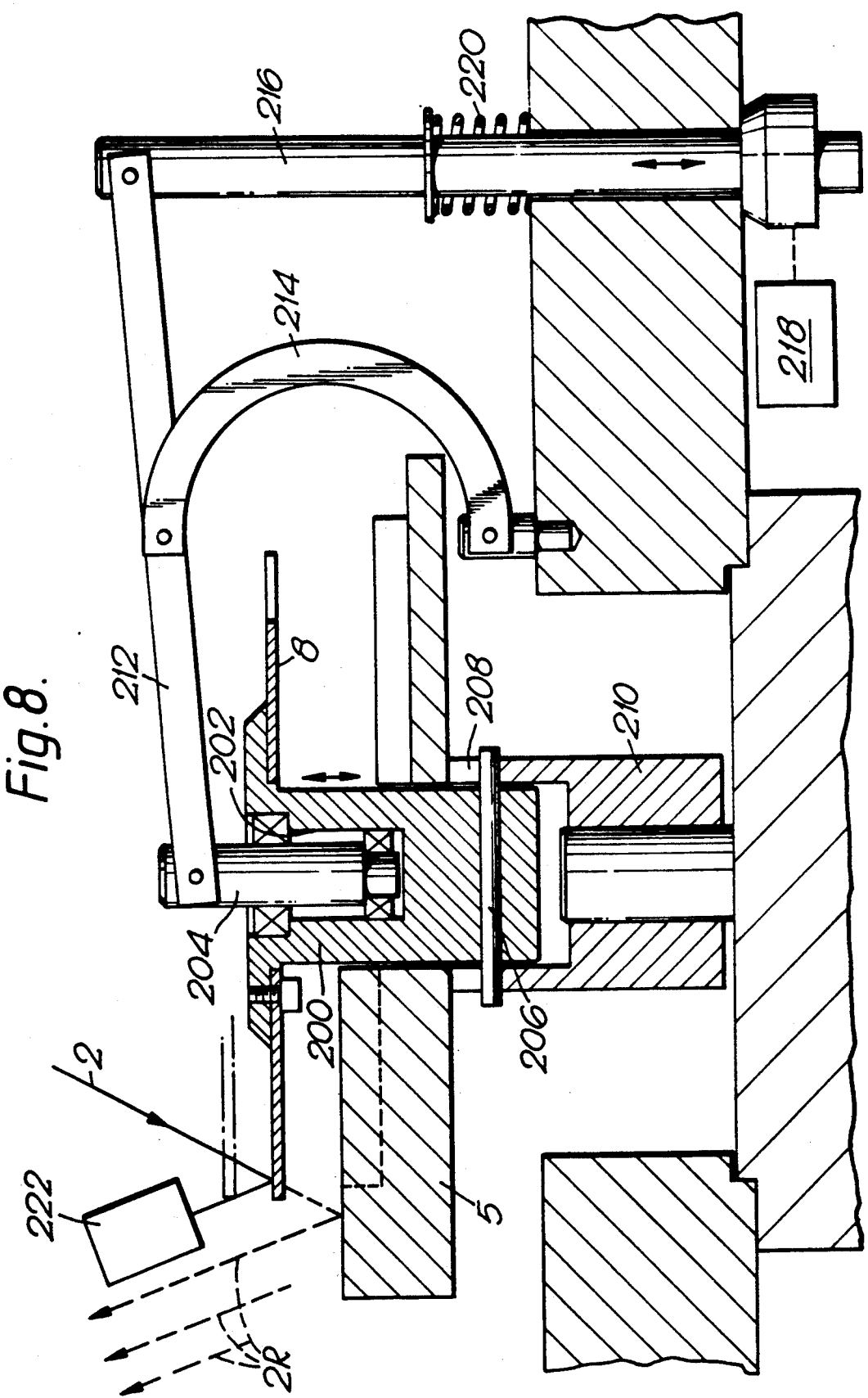

The invention will be further described, by way of example only, with reference to the accompanying diagrammatic drawings, in which:

FIG. 1 is a side view of apparatus for perforating the outer wrappers of cigarettes, FIGS. 1A, 1B, 1C and 1D are enlarged views of details of FIG. 1, FIG. 2 is a sectional view of further cigarette perforating apparatus, FIG. 3 is a different sectional view of the apparatus of FIG. 2, FIG. 4 is an enlarged side view of part of the apparatus of FIGS. 2 and 3, FIG. 5 is a part perspective view of still further cigarette perforating apparatus, FIG. 6 is a side view of part of the apparatus of FIG. 5, FIG. 7A is a perspective view of a rotary member usable in cigarette perforating apparatus, FIG. 7B is a plan view of the member of FIG. 7A, FIG. 7C is a graphical representation of laser pulses produced by the member of FIG. 7A, FIG. 8 is a transverse sectional view of a modified rotary member usable in cigarette perforating apparatus, FIG. 9 is a part perspective view of still further cigarette perforating apparatus, FIG. 10 is a part perspective view of yet still further cigarette perforating apparatus, FIG. 11 is a perspective view of another rotary member usable in cigarette perforating apparatus, and FIG. 12 is a plan view of the member of FIG. 11.

Figure 1A:
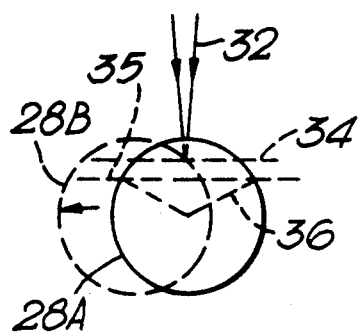

In the apparatus of FIG. 1 a conveyor drum 26, carries filter cigarettes 28 in regularly-spaced flutes 29 (not all of which are shown in the drawing). The drum 26 carries the filter tip ends of the cigarettes 28, which extend beyond the end of the drum, past a static laser beam 32 which is focused by a lens 33 at a point on a line 34 through which cigarettes 28 are conveyed in succession by the drum 26. The beam 32 is pulsed several (e.g. five) times as each cigarette 28 passes position 28A beneath the beam, so as to produce several perforations within a sector 36 around an upper part of the circumference of a cigarette. Note that the beam is exactly focused on the surface of a passing cigarette only at positions intermediate the top dead centre of the cigarette and the extremities of the sector 36: one such position is indicated with a cigarette in position 28B in FIG. 1A. The operation relies on the fact that the beam 32 can produce adequate perforations at positions within ±1 mm of its true focus. Thus, as indicated in FIG. 1A, the line 34 is about 1 mm below the top dead centre position of a cigarette 28 passing the beam 32 and about 1 mm above the point of intersection of the sector 36 with the circumference of the cigarette. Thus the perforations can be made on each passing cigarette 28 by pulsing the laser beam 32 so that it produces circumferentially-spaced perforations within the sector 36 as the cigarette passes the beam. The sector 36 extends for about ±60° around the circumference of the cigarette 28.

If it is desired to produce the beam 32 using two lower power lasers, a polarising mirror 139 may be used, this being transparent to a first beam 140 of polarised radiation from a first laser but reflective, as shown in FIG. 1, to a second beam 141 of differently polarised radiation from a second laser. The two lasers time-share the production of perforations and can therefore be of lower power than a single laser producing the beam 32.

Figure 1B:
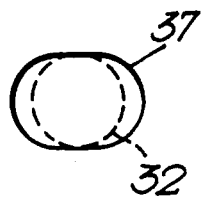
Figure 1C:

Note that all the perforations made in a cigarette will not be of the same shape: those at the top will be more circular whereas those at the sides will be elongated. The sizes of the perforations can be controlled by duration of the pulses. Preferably the duration of each pulse is controlled so that the perforations have approximately equal areas. If desired the pulses may be deliberately lengthened to produce slots, as opposed to holes: this uses the laser more efficiently. In order to compensate for the fact that perforations made at positions near the edge of the sector 36 are longer than those made at the centre (e.g. at the top of a cigarette) the beam 32 may be focused nearer or even beyond a line (35 in FIG. 1A) passing thorough the edges of sector 36. Thus, as indicated in FIGS. 1B and 1C. which respectively show perforations 37 and 39 made at the top and side of a cigarette, the beam 32 is slightly defocussed and wider at the top of a cigarette and narrower at the side where the beam is at or closer to its focus. Since the length of the perforation 39, caused mainly by the angle of incidence of the beam 32, is greater than that of the perforation 37, caused mainly by movement of the cigarette, it may be arranged that the difference in width of the beam 32 forming the respective perforations 37 and 39 is such as to compensate for the difference in length so that the areas of the perforations 37 and 39 are approximately equal. Thus, for example, if the length of the perforation 39 is approximately twice that of the perforation 37, the areas of the perforations may be made approximately equal by arranging the focusing of beam 32 such that its width at the perforation 37 is approximately twice that at the perforation 39. Note that some elongation of the perforations 37 and 39 occurs because of the movement of the cigarettes, and that the elongation will not be exactly the same for each perforation, due to the slightly different velocities at slightly different radii from the centre of the drum 26.

By way of further explanation it should be appreciated that, as with other optical systems, a combination of lenses and/or mirrors intended to bring a laser beam to a focus produces a spot of a size determined by features of the particular lenses and/or mirrors. The distance over which the spot is of approximately constant size may be referred to as its depth of focus. Because of the differing angles of incidence and slightly different velocities of each perforation or hole "position" and since the energy per unit area required to remove (i.e. burn off) cigarette wrapper can be regarded as constant it follows that for a beam working within its normal depth of focus it is necessary to vary the power of the beam to produce the holes efficiently. Moreover if the area of the holes is required to be constant then the durations of the pulses of the beam producing each hole will differ. In order to avoid the complications of a control system which would be necessary to achieve this the invention provides a profiled beam in which the size (and possibly shape) of the beam changes, as a function of its distance from the final focusing lens or mirror, in such a way that it compensates for the changing angle of incidence and velocity of the target cigarette so that the intensity, i.e. energy per unit area, on the cigarette remains constant. If this is achieved it follows that pulses of the same power and duration will make holes of equal area with the same penetration. It should be noted that the shape of the hole will not be the same at all positions. By appropriate design of the focusing arrangement the beam profile can be made to closely approximate that required, leading to considerable simplification of the control system. In addition, it should be noted that not all lasers have the facility to control the power at the rates which would be required absent the "profiled beam" arrangement: the arrangement therefore permits the use of less expensive lasers not having this facility.

The same laser beam 32 can be used to make perforations in other parts of the cigarettes 28 on the drum 26 by being operated during periods when it is not aligned with a cigarette at or near position 28A. Thus, the cigarette in position 28C (FIG. 1) may be perforated by pulsed beam 32A in the same way as the cigarette 28. An auxiliary focusing lens 38 is provided to focus the beam 32A on a line 40, which is about 1 mm below the top of the cigarette at position 28B so that perforations may be made in a sector extending for about ±60° around each cigarette as before.

In order to allow a straight path for the beam 32A a cigarette in position 28C should be aligned with a gap between cigarettes 28 at the top of the drum 26 (i.e. cigarettes in positions 28A and 28C should not be aligned as shown in the drawing). Of course, if necessary the beam 32A could be deflected or redirected (or redirected and focused) by one or more mirrors. In this way the beam passing between cigarettes 28 at the top of the drum 26 could be redirected and focused by a mirror 42 so as to perforate the underside of a cigarette 28 by means of a beam 32B focused on line 44. The beam 32 and lens 33 could be inclined slightly so that the beam 32A avoids the central axis of the drum 26, where there may be an obstruction (e.g. a drive shaft).

The beams 32A and 32B are capable of producing a further series of circumferentially-spaced perforations extending for about ±60° on the undersides of the cigarettes. In order to make perforations outside the range of the beams 32 and 32A or 32B a further mirror 45 is provided to produce one or more perforations at the sides of the cigarettes by means of a beam 32C. A further mirror could be provided to deflect the beam 32A (or 32B) to make a perforation on the other side of each cigarette. The beams 32A or 32B and 32C all operate through the gap between successive cigarettes 28, or at least during the period when the beam is not operating directly on the tops of cigarettes at or near position 28A.

Instead of using beams 32C to make perforations outside the normal ranges achievable with the beams 32 and 32A or 32B an auxiliary laser source could be used to provide a beam 132 which is focused by a lens 134 to provide a beam 132A part of which passes directly through a semi-silvered mirror 134 to impinge on a cigarette 31 and another part 132B of which is reflected by mirror 134 to impinge on the cigarette at position 28D. Since the source for beam 132 produces fewer perforations than the source for beam 32 it can be of relatively low power. A semi-silvered mirror similar to mirror 134 could be used to redirect part of the beam 32C so that perforations could be made on a side part of an additional cigarette (e.g. at 28C) at the same time as on a side part of cigarette 30.

Figure 1D:
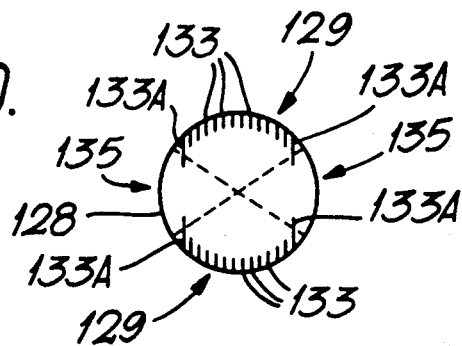

An alternative way of dealing with ventilation of cigarettes in the region of the circumference not readily accessible with the beams 32 and 32A or 32B is indicated in FIG. 1D which shows a cigarette 128 which has received perforations from the beams 32 and 32A or 32B around opposed parts 129 of its circumference. The perforations 133 and their depths are diagrammatically indicated: by controlling the duration and/or power of the pulses forming the outer perforations 133A these are made longer and/or deeper so that some ventilation is provided for the regions 135 not having perforations in the circumference.

In the arrangement of FIG. 1 the beam 32 from the laser source could be directed radially outward as opposed to inward, e.g. by using one or more reflectors to redirect a source beam extending parallel to the axis of the drum 26. In this case perforations on the radially outer parts of the cigarettes could be achieved by fixed mirrors positioned radially outwards of the drum 26, e.g. in positions similar to that of mirror 45.

FIGS. 2–4 show a system, incorporating a system similar to that of FIGS. 1 and 1A–1D, particularly suitable for perforating both streams of filter cigarettes issuing from a filter attachment machine. Referring first to FIG. 2, conveyor drums 60, 62 convey cigarettes 64 past a first laser beam 66 which is directed at a rotating disc 68 which has alternate clear and reflective segments. When a reflective segment of the disc 68 intercepts the beam 66 the latter is reflected through focusing lens 70 onto a cigarette 64 carried by the drum 60. Similarly, when a clear segment of the disc 68 intercepts the beam 66 the latter passes through the disc 68 and is reflected by a stationary reflector 72 through focusing lens 74 and on to a cigarette 64 carried by the drum 62. Note that the lenses 70 and 74 focus the beam in a manner similar to the lenses 33 and 38 of FIG. 1.

The beam 66 is pulsed and the rotation of the disc 68 is correspondingly timed so as to allow a series of perforations to be made in each of the cigarettes 64 carried by the drums 60 and 62 as they pass the position of the laser beams.

A second laser beam 76 is arranged at a different angular position of the drums 60 and 62 and cooperates with a similar rotating disc 78 and stationary reflector 80 to produce perforations in the inwardly-facing portions of the cigarettes 64 carried by the drums 60 and 62. Mirrors similar to the mirror 45 in FIG. 1 may be provided to produce additional perforations between the respective series of perforations produced by the beams shown in FIGS. 2 and 3. Instead of using separate laser beams 66 and 76 a single beam, as in FIG. 1, could be used: the arrangement of FIGS. 2 and 3 using separate beams is more appropriate when the circumferential spacing between cigarettes 64 is insufficient to allow adequate time during rotation of drums 60, 62 for a beam corresponding to the beam 32A to perform the function of perforating radially-inner parts of the circumferences of the cigarettes between operations to perforate radially-outer parts of the circumferences of successive passing cigarettes.

FIG. 4 shows in more detail the rotating disc 68, comprising reflective segments 68A and clear segments 68B. Although the beam 66 is pulsed at the source, an auxiliary beam chopper comprising a segmented wheel 82 rotatable with the disc 68 may be provided, particularly to produce a clean leading edge to each pulse (e.g. to avoid transient surges associated with electronic switching on of each pulse). Thus the segments of wheel 82 may be timed so that they momentarily intercept each beam pulse after it has been switched on at the source.

Instead of using rotating discs 68 and 78, which timeshare the laser beam, semi-silvered mirrors for power-sharing the beam could be used.

Although reference has been made to pulsing the laser beam (usually but not necessarily achieved at the source), if the power of the laser is matched to the energy required to make the perforations (i.e. dependent on number and size in unit time) it may be preferred to run the laser continuously and rely on external means to control the time during which the laser beam dwells at any particular position at which it is required to make a perforation. Typically the external means will be effective to switch the laser beam between different positions, usually on different cigarettes. Thus, for example, discs similar to the discs 68 and 78 can be used to switch a continuous beam back and forth between cigarettes respectively on drums 60 and 62. Continuous use of a laser is more efficient in terms of power utilisation, so that physically smaller and lower power lasers may be used. For example, wave guide lasers, with power outputs of up to about 150 watts, which have not previously been generally usable with laser cigarette perforation systems, may be used with the present arrangement.

It is known to control the size of the perforations in accordance with measured ventilation of previously-perforated cigarettes so as to achieve a desired ventilation level. With a pulsed laser this may be achieved by varying the duration of the pulse. With a continuously-emitting laser the same control may be achieved by varying the power of the laser. For example, the incident beam may be modified so that the resultant beams on the cigarettes are defocussed slightly, i.e. cover a slightly larger area, and the power of the beam increased slightly so as to maintain adequate intensity, thereby making slightly larger perforations. A similar effect may be achieved by oscillating the beam to make it slightly non-parallel to the axis of the drum, again so that the area of the cigarette on which the focused beam is incident may be varied (possibly with the increase in duration and/or power of the pulse).

FIGS. 5 and 6 show an arrangement for producing longitudinally spaced perforations on a cigarette 1. A laser beam 2 is focused by a first lens 3 to produce an intermediate image in a plane 4, having been reflected by a stepped rotating mirror 5. The mirror 5 has three stepped faces 5A, 5B and 5C, each of which occupies a sector extending 120° around the rotational axis of the mirror 5. As shown in FIG. 6, on rotation of the mirror 5 the effect is to produce intermediate images 4A, 4B and 4C which are displaced in the plane 4 due to the different path lengths from the lens 3 to the respective reflecting faces 5A, 5B and 5C on the mirror 5. The intermediate images 4A, 4B and 4C are respectively refocused by a second lens 6 to produce perforations at final focuses corresponding to longitudinally spaced positions 7A, 7B and 7C on the cigarette 1.

It may be noted that although the plane 4 containing the intermediate images is not parallel to the beam 2, by arranging for the axis of the lens 6 to be inclined slightly to the beam (in this case at about 7.5°), the plane of the final focus can be arranged to lie on the cigarette 1, which is conveniently parallel to the beam 2. Typically the positions 7A and 7C, corresponding to the extent of longitudinal spread of perforations on the cigarette 1, are up to 3 mm apart. Although not shown in FIG. 7, the cigarette 1 is conveyed on a fluted drum, which may form part of a filter attachment machine.

The intermediate images 4A, 4B and 4C need not be formed beyond the mirror 5, and could be formed upstream of or on the mirror.

FIGS. 7A and 7B show the mirror of FIGS. 5 and 6 with a shaped mask 8 partly obscuring the reflective faces 5A, 5B and 5C. The mask is rotatable with the mirror 5 and has a surface formed with three tapered radial arms which extend above the transitions between the faces 5A, 5B and 5C. The surface of the mask 8 may be non-reflective (i.e. absorbent), or could reflect an incident beam to an adjacent dump (e.g. absorbent material with a high thermal mass), or could have a diffuse "Lambertian" finish which is rough so as to prevent any specular reflection. As shown in FIG. 7B, during rotation of the mirror 6 the beam 2 is incident at a given radius corresponding to the circle 9 shown in FIG. 7B and also corresponding to a particular width of the tapered arms of the mask 8. It will be apparent that the relative periods during which beam 2 is reflected by the faces 5A, 5B and 5C as compared with the periods during which is absorbed by the arms of the mask 8 may be varied by arranging for the radius of the circle 9 to be varied. Thus, the beam 2 is reflected for relatively longer periods if the radius of the circle 9 is increased and for relatively shorter periods if the radius is decreased. One way of achieving this variation is to transversely shift the axis of rotation of the mirror 5 relative to the beam 2, as indicated by arrow 10 in FIG. 7A. Movement of the axis in the direction shown will increase the radius of circle 9 and therefore increase the duration of the dwell of reflected beam 2R on a particular final position on the cigarette 1. In this way the size of the perforation formed, and hence the level of dilution for a given number of perforations, may be controlled, since within the expected operating periods there is a direct (although not necessarily linear) relationship between period of dwell and size of perforation.

Referring to FIG. 7C, which is a plot of intensity of reflected beam 2R (irrespective of displacement or direction) against time, the effect of varying the radius of circle 9 is to alter the width of the pulse 11 of relatively high intensity corresponding to where the beam is being reflected by one the faces 5A, 5B or 5C.

Note that shift of the position of mirror 5 (or simply of mask 8) along its axis also has the effect of altering the effective radius of circle 9 in the plane of the mask, and hence may be used to control dilution. Similarly, of course, the mask 8 may be replaced by a mask of a different shape.

FIG. 8 shows an arrangement in which a stepped rotating mirror 5 is provided with a mask 8, the position of which is axially movable. For this purpose, the mask 8 is connected to a cylindrical boss 200 having an axial upper bore 202 rotatably supporting a stub shaft 204. The lower end of the shaft 200 carries a transverse pin 206 the ends of which are engaged in opposed slots 208 of a cylindrical member 210 rotatable with the mirror 5. The shaft 204 is pivotally connected to one end of a lever 212 which is itself pivotally supported on a bracket 214. The other end of the lever 212 is connected to an actuating rod 216. An actuator 218 (e.g. a motor) is arranged to move the rod 216 against action of a return spring 220 surrounding the rod.

Downward movement of the rod 216 by the actuator 218 will cause corresponding upward movement of the mask 8. Hence, the actuator 218 is capable of positioning the mask 8, relative to the mirror 5, so as to vary the level of interception of the mask with the incident laser beam 2. In the position shown in full lines in FIG. 8 the mask 8 is in the position in which it intercepts the beam to a relatively little extent (i.e. corresponding to larger perforations and higher dilution); in the position shown partly by chain-dot lines the mask 8 intercepts the beam to a greater extent (i.e. corresponding to smaller perforations and lower dilution). Note that engagement of the pin 206 in the slots 208 ensures that the mask 8 continues to rotate with the mirror 5 (drive for which is not shown in the drawing) in any position in which it is place by the actuator.

A heat sink 222 is arranged to absorb that part of the beam 2 reflected by the mask 8. Reflected beams 2R, reflected by the mirror 5 pass along paths towards the cigarettes.

FIG. 9 shows an arrangement in which the beam 2 is reflected by the stepped rotating mirror 5 and the reflected beam 2R directed towards a reflective chopper wheel 12 which has around its periphery a series of spaces and reflective portions which alternately intercept the beams. The effect of this is that when a reflective portion of the wheel 12 intercepts the beam 2R it is redirected towards a static mirror 13 and subsequently along a path 2B which is parallel to the original beam 2R. Thus the wheel 12 may be used to time-share the beam 2R between parallel tracks, e.g. for directing it towards different cigarettes. The wheel 12 is synchronised with the wheel 5 and preferably is arranged so that beams from each reflective face of the mirror pass to each track during each revolution of the mirror 5. Thus, for example, if the wheel 12 rotates at the same rate as the mirror 5 it should have at least one space and one reflective element corresponding to each face of the mirror.

FIG. 10 shows an arrangement in which the rotating mirror 5 and mask 8 are mounted for rotation on a common shaft with the chopper wheel 12, thereby forming a combination unit 14. An incident beam 2 passes through a first focusing lens 3 and the reflected beam is directed towards a static mirror 15 arranged so as to reflect the beam across the path of the chopper wheel 12, so that a beam passing through the spaces between the reflective elements of the chopper wheel subsequently intercepts a further stationary mirror 16 and is directed along a path 2A. When the beam reflected by mirror 15 is intercepted by a reflective element of the chopper wheel 12 it is directed along a path 2B which is parallel to the path 2A. Each of the beams 2A and 2B is subsequently reflected and focused in turn by respective mirrors 17A, 17B and lenses 18A, 18B, so as to be finally focused on cigarettes 1A and 1B respectively carried by drums 19A and 19B.

The combination unit 14 thus performs three basic functions. It provides an array of staggered images by means of the stepped faces of the mirror 5 so that longitudinally spaced perforations on each of the cigarettes 1A and 1B may be produced. It provides dilution control by variation of the radius on the wheel 5 at which the beam 2 is incident in cooperation with a mask 8 (or, alternatively, by replacement of the mask 8 with one having a different shape). Finally, it causes switching of the reflected beam between the two tracks, using the chopper wheel 12, so that two streams of cigarettes, as conventionally issue from a filter attachment machine, can be perforated by the same arrangement.

Note that the mirror 5 is shown as having only three stepped faces. In practice, there could be more than this, e.g. up to thirty or more. The combination unit 14 could then be run at a speed in RPM which corresponds to the number of cigarettes per minute being produced by the machine with which the unit is associated, the number of stepped mirror faces corresponding to the total number of holes per cigarette.

The order of the three basic elements, mask 8, stepped wheel 5, and chopper wheel 12 need not be as shown in the combination unit 14. The chopper wheel 12 could be located above the mask 8 (as long as it does not interfere with the incident beam 2 — e.g. it could be annular). This could have the advantage of reducing the overall diameter of the unit, which would be a particular advantage at high rotational speeds.

It should also be noted that in the arrangement shown in FIG. 10 the mask 8 which controls dilution levels, affects each of the beams 2A, 2B equally. It may sometimes be required to control perforation sizes independently in each track to take account of differences between the tracks, e.g. ageing of the respective optical components. One way of achieving this would be to provide an additional annular element on the combination unit 14, the element having a toothed or similar profile capable of intercepting the beam 2A. Adjustment of the proportion of the beam 2A which is intercepted could then be achieved by slight movement of the reflector 16. By suitable adjustment of mask 8 (which affects both beams 2A and 2B) and the reflector 16 (to alter the effect of the additional rotary element on beam 2A) it will be seen that a range of relative dilution levels may be provided by the beams 2A and 2B.

An alternative arrangement for altering dilution levels in the cigarettes 1A and 1B respectively acted on by beams 2A and 2B is to provide an opaque (absorbent or reflective) member for intercepting a portion of one or both beams. Thus, particularly where the beams are relatively closely spaced, a convenient arrangement is to provide an opaque member in the space between the beams and movable laterally in either direction so to partially intercept and thereby reduce the effective power of one or other of the beams. The opaque member may itself act as a heat dump, or may reflect the incident radiation to such a dump, or may simply scatter the radiation.

FIGS. 11 and 12 show a modified combination unit 20, usable in a system similar to that shown in FIG. 10. The unit 20 has a mask corresponding to the mask 8 but for clarity this is not shown in FIGS. 12 and 13. Similarly the unit cooperates with static mirrors and lenses similar to those shown in FIG. 10 but these also are not shown in FIGS. 11 and 12. The unit 20 has multiple faces, only three of which 20A, 20B and 20C are shown in FIGS. 11 and 12: for clarity the steps between the faces are shown of exaggerated depth. The unit 20 has an integral chopper wheel 21 having reflective elements 21A and spaces 21B of similar angular width. As shown in FIG. 12, each reflective face 20A, 20B and 20C subtends the same angle as and is angularly aligned with a reflective element 21A and space 21B of the wheel 21. This arrangement can be conveniently used with two laser beams 22A and 22B, which may come from separate laser sources which are incident on the reflective faces 20A, 20B etc. at an angular spacing corresponding to that of a reflective element 21A (or space 21B). The result is that the reflected beams 22C, 22D are switched in anti-phase between two tracks (i.e. the reflective beams 22C, 22D may correspond with the beams 2A, 2B in the system of FIG. 10). Using two laser beams 22A, 22B has the advantage that if one laser source fails the other may continue to run with limited performance (i.e. reduced dilution, reduced speed of operation of the system and/or deterioration in perforation appearance).

The number of perforations created in each cigarette may be varied by simple blocking of stepped mirror faces. This could be achieved either manually (e.g. by changing the mask 8) or automatically as an integral part of a complex mask design. In this latter respect note that the mask 8 could be replaced by a complex mask having multiple relatively-movable elements. The facility to reduce the number of perforations on each cigarette would be especially useful where low dilutions are required since these generally need only a small number of perforations.

The stepped faces in the mirror 5 (or combination unit 20) need not all have the same height. If the heights are "random" the perforations would be scattered over the available longitudinal scan, rather than being cut in regular rows. The resultant pattern might appear more discreet than existing configurations, and hence be more attractive to manufacturers of cigarettes and/or consumers.

In each of the arrangements described with reference to the systems of FIGS. 5–12 it is envisaged that the incident laser beam would be continuous, the beam being switched between various locations where it is required by the wheel 5 and other reflective elements or being absorbed (or reflected to a dump) by the mask 8 (or a similar mask). It is however perfectly possible to use the same system with a pulsed incident laser beam if that is desired. Note, however, that with the rate of production of modern high speed cigarette making machines (e.g. 10,000 cigarettes per minute) and the number of perforations required by some manufacturers, the switching speed necessary to pulse the laser is relatively high, and may not be available at source for some types of laser.

It should be understood that the systems of FIGS. 5–12 are usable in combination with the systems of FIGS. 1–4.

Production of perforations by laser beams necessarily produces products of combustion which are preferably removed from the immediate region of the apparatus. One reason for this is that the surfaces of lenses and mirrors may otherwise become coated with such products and consequently operate much less efficiently and effectively. One way in which it is possible to remove such unwanted products is to provide a suitable air flow across or in the vicinity of the cigarettes being perforated and/or any adjacent focusing or reflecting element.

References herein to semi-silvered mirrors (e.g. mirror 134 in FIG. 1) do not necessarily imply use of devices identical to such mirrors used for optical frequencies: at laser frequencies commonly used for making perforations in cigarettes the functionally equivalent devices more commonly used are so-called beam splitters (usually of multi-dielectric construction).

We claim:

1. Apparatus for perforating cigarettes by means of a laser beam, comprising a rotary member having at least one reflective surface arranged to intermittently intercept a laser beam during rotation of the member so that the laser beam is directed along one path by the surface and follows at least one other path when the laser beam is not intercepted by the surface, said paths leading to different cigarette positions whereby the laser beams on said paths produce perforations in different cigarettes or different positions on a cigarette, and means synchronized with the rotary member and rotatable therewith for controlling the quantity of energy directed along said paths including intercepting means arranged to intercept the beam during predetermined periods so that it does not produce perforations during said periods.

2. Apparatus as claimed in claim 1, wherein the controlling means is at or associated with the rotary member.

3. Apparatus for perforating cigarettes by means of a laser beam, comprising a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means synchronised with the rotary member for controlling the quantity of energy directed along said paths, wherein the controlling means comprises means for varying the angle of rotation of the rotary member during which the surface is effective to direct the beam along said one path.

4. Apparatus as claimed in claim 3, wherein the varying means includes means defining an angular width of said reflective surface which varies with distance from the axis from said rotary member.

5. Apparatus as claimed in claim 4, wherein the controlling means comprises means for producing relative movement of the beam and said rotary member, whereby the beam may be incident at said surface at different radial distances from said axis.

6. Apparatus as claimed in claim 4, wherein said defining means comprises an intercepting member rotatable with said rotary member.

7. Apparatus as claimed in claim 6, wherein said intercepting and rotary members are coaxial and said controlling means comprises means for producing relative axial movement of said intercepting and rotary members.

8. Apparatus for perforating cigarettes by means of a laser beam, comprising a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means synchronized with the rotary member for controlling the quantity of energy directed along said paths, wherein the rotary member has a plane of rotation containing a series of reflective portions and means defining transmissive regions between said portions which extend around the member, with each portion occupying a sector with radial transitions between the portions, and wherein said energy controlling means include a coaxial intercepting member, mounted in front of the rotary member relative to an incident beam, and having a series of intercepting and transmissive portions provided with non-radial transitions between the portions so that the beam is intercepted during predetermined periods during which periods it does not produce perforations.

9. Apparatus as claimed in claim 8, wherein said intercepting and transmissive portions of said intercepting member are symmetrically arranged with respect to said reflective and transmissive portions of said rotary member so as to have a similar effect on each of said reflective and transmissive portions.

10. Apparatus as claimed in claim 1, wherein the rotary member has reflective surfaces at different levels along the axis of rotation.

11. Apparatus for perforating cigarettes by means of a laser beam, comprising a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means synchronised with the rotary member for controlling the quantity of energy directed along said paths, including a reflective rotatable element arranged to further divert a beam reflected from the surface of the rotary member.

12. Apparatus as claimed in claim 11, wherein the rotatable element comprises alternate reflective and transmissive sections arranged to direct a beam reflected from said surface alternately along generally parallel paths which respectively lead to different cigarette positions.

13. Apparatus as claimed in claim 12, wherein the rotatable element and rotary member are synchronised and arranged with at least one reflective and one transmissive section of the rotatable element associated with said surface of the rotary member.

14. Apparatus as claimed in claim 11, wherein the rotatable element and rotary member are rotatable about a common axis.

15. Apparatus for perforating cigarettes by means of a laser beam, comprising a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means arranged to allow partial interception of a beam incident on or reflected from said surface so as to determine the amount of radiation being directed along the path associated with said surface.

16. Apparatus as claimed in claim 15, further including a series of spaced reflective elements synchronised for rotation with said rotary member and arranged so as to cause a beam reflected from a surface of said rotary member to be directed along first and second paths according to whether the beam is intercepted by a reflective element or not.

17. Apparatus as claimed in claim 16, wherein said reflective elements and said rotary member are rotatable about a common axis.

18. Apparatus for perforating cigarettes by means of a laser beam, including a rotary member having reflective surfaces at different levels along the axis of rotation, said surfaces being arranged to intercept a laser beam in turn during rotation of the member and to direct the laser beam along different paths for producing perforations in different cigarettes or different positions on a cigarette, and means at the rotary member for controlling the quantity of energy directed along said paths including intercepting means arranged to intercept the beam during predetermined periods so that it does not produce perforations during said periods.

19. Apparatus for perforating cigarettes by means of a laser beam, comprising a rotary member having reflective surfaces at different levels along the axis of rotation, said surfaces being arranged to intercept a beam during rotation of the member and to direct the beam along different paths for producing perforations in different cigarettes or different positions on a cigarette, and means arranged to allow partial interception of the beam incident on or reflected from at least one of said surfaces so as to determine the amount of radiation being directed along the path associated with said surface.

20. Apparatus for perforating cigarettes by means of a laser beam, comprising a rotary member having at least one reflective surface arranged to intermittently intercept a beam during rotation of the member so that the beam is directed along one path by the surface and follows at least one other path when the beam is not intercepted by the surface, said paths leading to different cigarette positions whereby the beams on said paths produce perforations in different cigarettes or different positions on a cigarette, and means synchronised with the rotary member for controlling the quantity of energy directed along said paths, further including a series of spaced reflective elements synchronised for rotation with rotary member and arranged so as to cause a beam reflected from a surface of said rotary member to be directed along first and second paths according to whether the beam is intercepted by a reflective element or not.

* * * * *